United States Patent
Andorf et al.

(10) Patent No.: US 6,550,238 B2
(45) Date of Patent: Apr. 22, 2003

(54) APPARATUS FOR REDUCING THE EMISSION OF VAPORIZED HYDROCARBONS IN A FUEL SUPPLY SYSTEM

(75) Inventors: Renato Andorf, Immenstaad (DE); Thomas Birkhofer, Immenstaad (DE); Matthias Bohl, Leutenbach (DE); Norbert Markert, Markdorf (DE); Werner Maunz, Markdorf (DE); Ralf Moos, Friedrichshafen (DE); Carsten Plog, Markdorf (DE); Thomas Stengel, Friedrichshafen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/931,174

(22) Filed: Aug. 17, 2001

(65) Prior Publication Data

US 2002/0056269 A1 May 16, 2002

(30) Foreign Application Priority Data

Aug. 17, 2000 (DE) .......................... 100 40 125

(51) Int. Cl.$^7$ ................................. F01N 3/00
(52) U.S. Cl. ....................................... 60/283
(58) Field of Search .................... 60/283; 123/518, 123/519

(56) References Cited

U.S. PATENT DOCUMENTS

| 3,289,711 A | * | 12/1966 | Hall |
| 3,352,294 A | * | 11/1967 | Biller et al. |
| 3,393,669 A | | 7/1968 | Vardi et al. .................. 123/136 |
| 3,581,782 A | * | 6/1971 | Onufer .......................... 141/59 |
| 4,846,134 A | * | 7/1989 | Perry et al. .................. 123/520 |
| 5,207,734 A | * | 5/1993 | Day et al. .................... 123/520 |
| 5,393,329 A | * | 2/1995 | Inagaki et al. ............... 123/519 |
| 5,395,428 A | * | 3/1995 | Von Bliicher et al. ........ 95/104 |
| 5,803,136 A | * | 9/1998 | Hartsell, Jr. ................... 141/7 |
| 5,934,260 A | * | 8/1999 | Gadkaree et al. ............ 123/520 |
| 6,122,908 A | * | 9/2000 | Wirmark ...................... 60/283 |

FOREIGN PATENT DOCUMENTS

| DE | 19952092 | 10/2000 |
| GB | 2 303 668 A | 2/1997 |
| GB | 2 340 054 A | 2/2000 |
| WO | WO 95/08702 | 3/1995 |

OTHER PUBLICATIONS

British Search Report.

* cited by examiner

Primary Examiner—Thomas Denion
Assistant Examiner—Diem Tran
(74) Attorney, Agent, or Firm—Crowell & Moring LLP

(57) ABSTRACT

An apparatus for reducing the emission of vaporized hydrocarbons in a fuel supply system. The apparatus comprises a filter for binding the hydrocarbons. A catalyst for oxidation of the hydrocarbons to carbon dioxide and water is provided downstream of the filter.

19 Claims, 5 Drawing Sheets

APPARATUS FOR REDUCING THE EMISSION OF VAPORIZED HYDROCARBONS IN A FUEL SUPPLY SYSTEM

BACKGROUND AND SUMMARY OF THE INVENTION

This application claims priority of German Patent Document DE 100 40 125.2 filed Aug. 17, 2000, the disclosure of which is expressly incorporated by reference herein.

The invention relates to a method and apparatus for reducing the emission of vaporized hydrocarbons in a fuel supply system, in particular for a motor vehicle.

Regulations governing emission of waste gases will become even stricter in the future, and are increasingly including limitations on emissions of vaporized material from vehicles. One source of emissions of this type is the fuel supply system. To prevent the escape of hydrocarbon-containing fuel vapours from a fuel container or a carberator in motor vehicles, fuel supply systems have a closed design and are provided with an activated carbon filter. (See, for example, German Patent document DE 199 52 092). When an internal combustion engine is not running, fuel vapours escaping from the tank region of the fuel supply system go to the activated carbon filter in which the major part of their hydrocarbon constituents are held back and do not get into the environment. When the internal combustion engine is running, the activated carbon filter is flushed with drawn-in air. The hydrocarbons previously absorbed in the filter are thus returned to the internal combustion engine for combustion.

This technique described makes it possible to prevent most hydrocarbon emissions from the fuel supply system. A persistent problem, however is the release of hydrocarbons (hereinafter also designated as HCs for short) from the partly regenerated activated carbon filter, or in an extreme case from the unregenerated activated carbon filter, when the vehicle is not run for a number of days. To meet future limits, this emission has to be prevented.

It is an object of the invention to provide a method and apparatus for reducing hydrocarbon emissions from the filter for binding the hydrocarbons, when the vehicle is not run for a prolonged period.

This and other objects and advantages are achieved by the catalytic reactor apparatus according to the invention, in which a catalyst for oxidizing hydrocarbons to carbon dioxide and water is installed downstream of the existing filter (in particular an activated carbon filter), so that any hydrocarbons exiting from the activated carbon filter can be oxidized in this manner.

As an oxidation catalyst, use may be made, in particular, of noble metals (e.g. Pt, Pd, Rh, Ir or Au) or transition metals (e.g., Mn or Co) which can be applied to a microporous support, such as $Al_2O_3$, $SiO_2$, $TiO_2$ or a zeolite.

The catalytic reactor according to the invention can be produced in various designs. The catalyst can, for example, be provided as a bed comprising pellets, spheres or extrudates or be applied as a coating to a geometric support made of ceramic or metal (The term "geometric support" is used here to distinguish it from a "microporous support"; the latter is often also referred to as a "washcoat"). Any necessary heating of the catalyst can be carried out, for example, electrically.

In a particularly advantageous embodiment of the reactor, the catalyst is applied as a layer to an electrically insulating substrate provided with a heating structure, e.g., an aluminium oxide substrate. The advantage of this design is the ability to heat the catalyst directly. In this embodiment, a particularly compact reactor can be achieved.

In a further embodiment, the substrate comprises a PTC (positive temperature coefficient) ceramic. Application of an electric potential enables a defined temperature to be set without further regulation. An additional heating structure is not necessary in this embodiment.

In a further advantageous embodiment, a material which can store HCs is introduced into the reactor in addition to the oxidation catalyst. A particularly important storage mechanism is adsorption. In this process variant, the hydrocarbon is stored over a particular period of time during which no heating of the reactor is necessary. After a particular loading of the storage material has been reached, the reactor is heated to a temperature above the start temperature of the catalyst. This results in desorption of the stored hydrocarbon and reaction of the hydrocarbon in the presence of the oxidation catalyst to form carbon dioxide and water.

A significant advantage of this embodiment is the reduction in the electrical energy required, since no heating of the reactor is necessary during the HC storage phase.

HC storage material and catalyst can be present in physically separate regions or can be mixed with one another. In the former case, the HC storage material should be located upstream (based on the flow direction of the gas) of the catalyst. Thus, for example, catalyst and HC-storing solid can each be present as particulate materials which can be kept separate from one another or mixed with one another. Likewise, catalyst and HC-storing solid can be mixed with one another in powder form (mixture of solids) and applied to a geometric support.

It is also possible for HC-storing solid and catalyst to be arranged in successive layers on a geometric support.

Catalyst and HC-storing solid can also be applied to different sides of an electrically insulating substrate (e.g., an aluminium oxide substrate), with the catalyst being heated directly by means of a heating structure applied to the substrate. In this embodiment, the reactor can be made particularly compact.

In a further embodiment, the microporous catalyst support can also take on the function of the HC-storing solid.

The present invention enables the HC emissions from the fuel supply system of a motor vehicle to be reduced, thus making a contribution to meeting future waste gas limits.

The reactor of the invention for catalytic oxidation and, if desired, for intermediate storage of HCs can be made very small, so that the apparatus of the invention requires little space.

The invention can be used in any type of vehicle, in particular passenger cars.

The invention can also be used, in particular, in a fuel supply system for a vehicle powered by one or more internal combustion engines or for a vehicle powered by means of fuel cells.

Other objects, advantages and novel features of the present invention will become apparent from the following detailed description of the invention when considered in conjunction with the accompanying drawings.

DETAILED DESCRIPTION OF THE DRAWINGS

Figure 1:
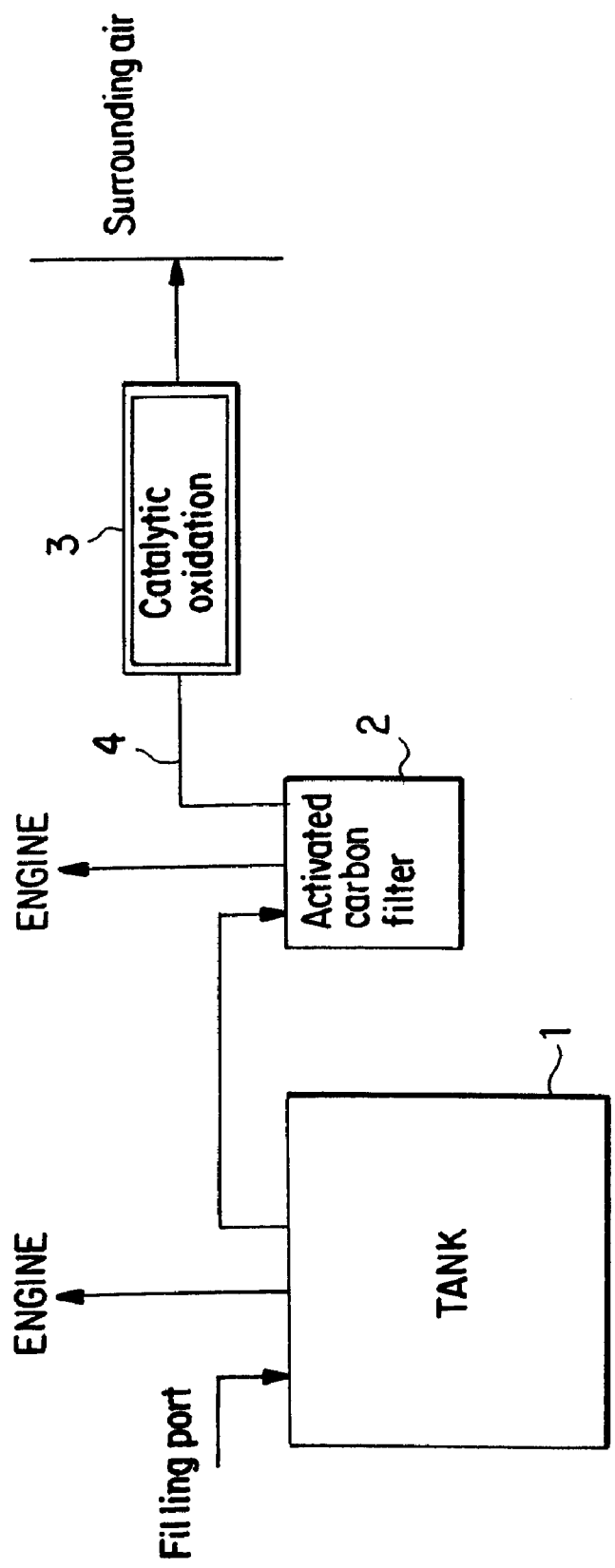
FIG. 1 schematically shows a fuel supply system comprising the catalytic reactor according to the invention.

FIG. 1 shows a fuel supply system with a fuel tank and downstream filter for binding hydrocarbons that escape from the tank. Here, the filter 2 is configured as an activated carbon filter. The catalytic reactor 3 according to the invention is located in a breather line 4 which leads from the activated carbon filter 2 to the atmosphere. It contains an oxidation catalyst, preferably in the form of a heterogeneous catalyst comprising noble metal (e.g. Pt/Al₂O₃), in the presence of which the hydrocarbons coming from the activated carbon filter are oxidized to carbon dioxide and water.

In an embodiment presented by way of example, the catalytic oxidation was carried out in a reactor in which the catalyst was present in the form of pellets. As a hydrocarbon, use was made of butane diluted with air.

The reaction conditions are summarized below:

| Reactor: | reactor material: | steel |
|---|---|---|
| | diameter (internal): | 19 mm |
| | bed height: | 25 mm |
| Catalyst: | Pt/Al₂O₃ (0.5% by mass of Pt) as pellets | about 5 g |
| | mass of catalyst: | |
| Operating parameters | volume flow: | 50 ml/min |
| | hydrocarbon: | butane |
| | butane concentration: | 100 ppm in air |

Figure 2:
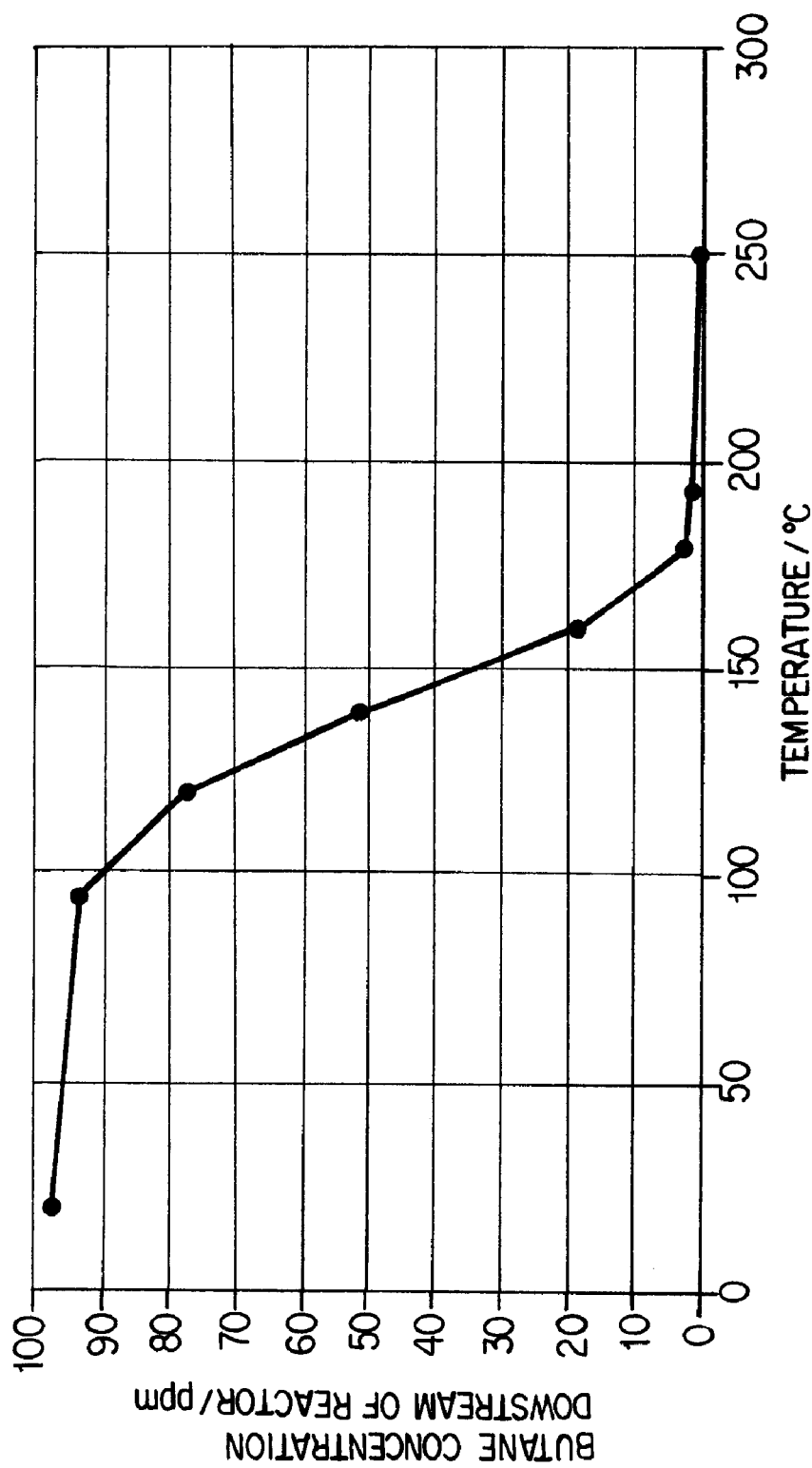
FIG. 2 depicts a graph which shows the influence of the operating temperature on the butane concentration at the outlet of the catalytic reactor of the invention (catalyst: Pt Al₂O₃, 0.5% Pt by mass in the form of pellets; mass of catalyst: 5 g; total volume flow: 50 ml/min; butane concentration at the inlet: 100 ppm in air)

An example of a result is shown in FIG. 2. The butane concentration at the outlet of the reactor was monitored as a function of the reactor temperature by means of a flame ionization detector. In this way, a significant decrease in the butane concentration downstream of the reactor was found at temperatures above 100° C., which is attributable to the catalytic reaction in the reactor to form $CO_2$ and $H_2O$. At a temperature of 140° C., the butane conversion is about 50%. At temperatures above 180° C., complete conversion of the butane can be achieved under the conditions specified.

Figure 3:
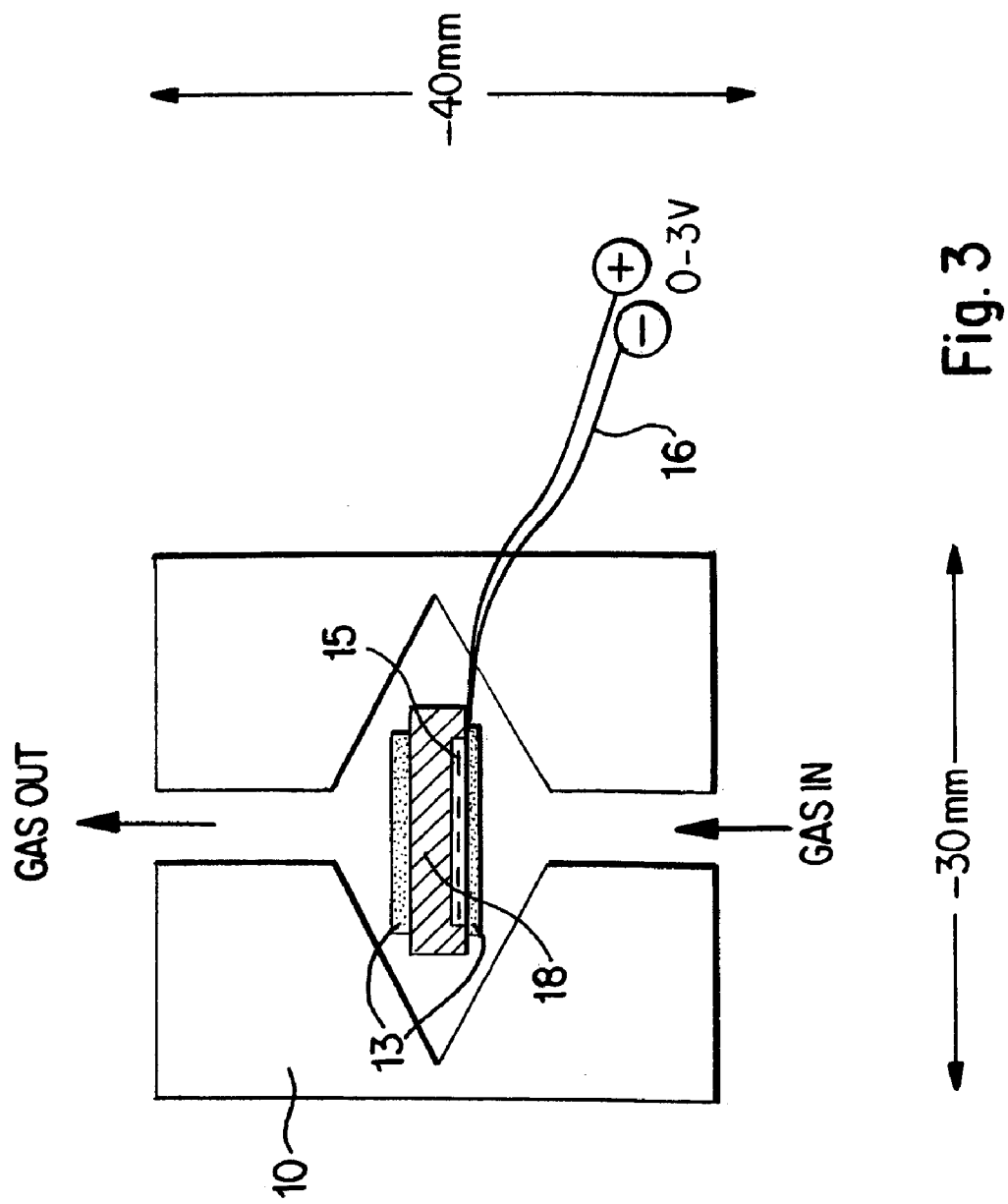
FIG. 3 schematically shows an embodiment of the catalytic reactor according to the invention.

In a further, particularly advantageous, embodiment of the reactor as shown in FIG. 3, the catalyst 13 is applied in the form of a layer to an Al₂O₃ substrate 18 provided with a Pt heating structure 15. The substrate 18 can be in the form of a microchip. As can be seen from FIG. 3, the resistance heating structure 15 in this embodiment was applied to the underside of the substrate 18. The catalytic layer 13 was applied on top of this. A further catalytic layer 13 was applied to the upper side of the substrate 18. The substrate 18 is located in a reaction chamber 10 made of Teflon (diameter: 30 mm, length: 40 mm). The substrate is heated by applying an electric potential to the Pt heating structure 15. For this purpose, appropriate contact wires 16 were passed out from the reaction chamber. In this way, a defined temperature can be set in the substrate, and thus in the catalyst, as a function of the electric potential. The operating temperature was varied in the range from 20 to 250° C. Under the present conditions, this corresponds to electric potentials of from 0 to 3.3 V. The associated electric power was up to 1.4 W (250° C.; 3.3 V).

The reaction conditions are summarized below:

| Reactor: | reactor material: | Teflon |
|---|---|---|
| Substrate: | material: | Al₂O₃ (planar) |
| | length × width: | 10 mm × 6 mm |
| | heating structure: | platinum |
| Catalyst: | Pt/Al₂O₃ (5% by mass of Pt) | about 20 mg |
| | mass of catalyst: | |
| Operating parameters | volume flow: | 5 ml/min |
| | hydrocarbon: | butane |
| | butane concentration: | 100 ppm in air |

Figure 4:
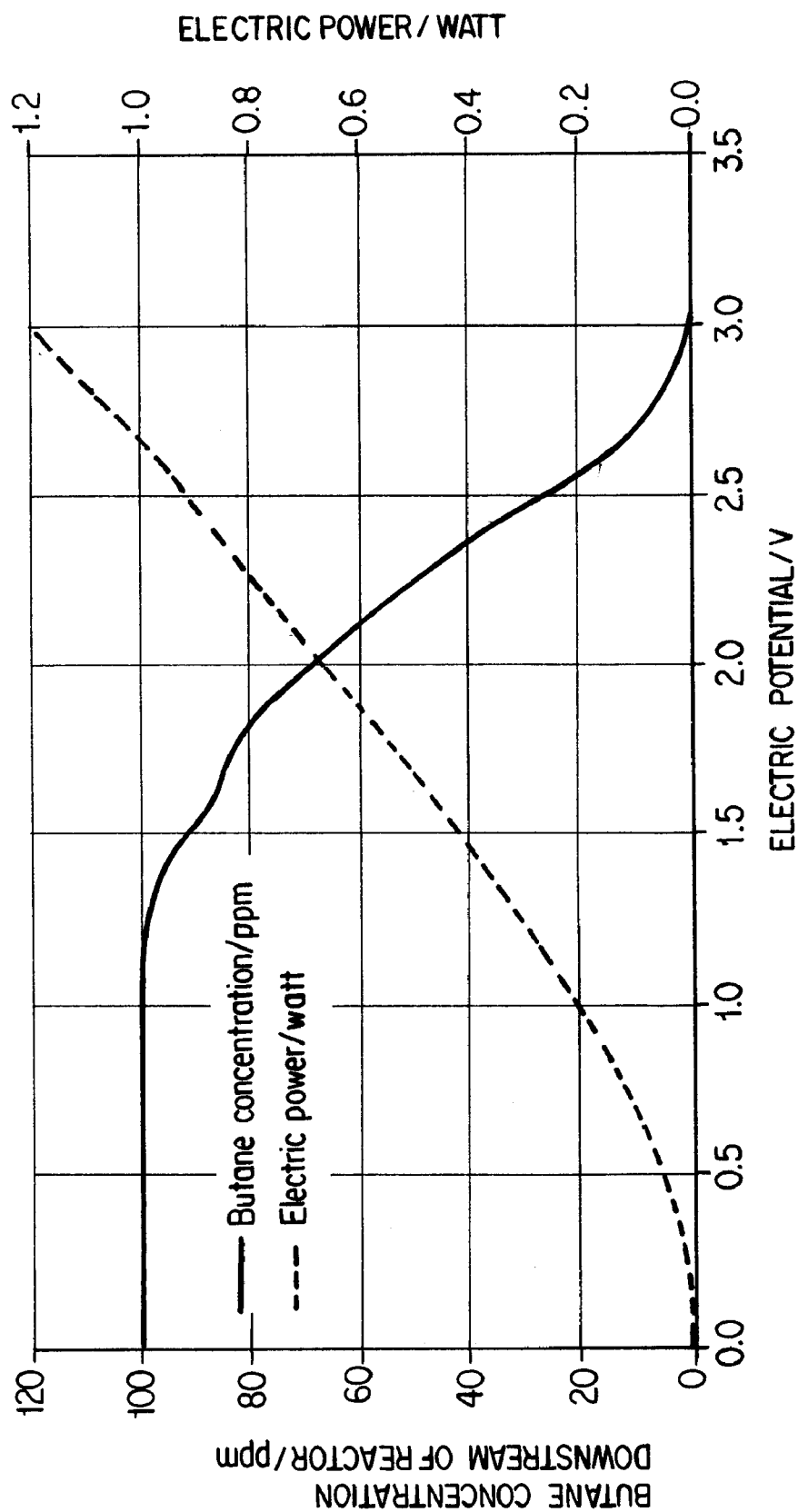
FIG. 4 shows the butane concentration at the outlet of a catalytic reactor according to the invention and power uptake as a function of the electric potential (catalyst: Pt/Al₂O₃ 0.5% Pt by mass; total volume flow: 5 ml/min; butane concentration (inlet): 100 ppm in air)

An example of a result obtained using the microreactor described is shown in FIG. 4. The operating conditions were as follows:

Total volume flow: 5 ml/min

Hydrocarbon: butane

Butane concentration: 100 pm in air

FIG. 4 shows the butane concentration at the outlet of the reactor and the power uptake as a function of the electric potential applied. When the potential is increased above about 1.2 V (about 70° C.), a decrease in the butane concentration downstream of the reactor is observed. The concentration decreases with increasing potential and is close to zero at an operating potential of about 3 V (about 220° C., 1.2 W). The decrease in the butane concentration is effected by the catalytic oxidation of butane in the reactor. The increase in the operating potential increases the reaction temperature in the catalyst chip, which is in turn associated with an increased catalyst activity and higher butane conversions.

In a further embodiment of the invention, the catalytic oxidation of the hydrocarbon is combined with adsorption of the hydrocarbon. This embodiment is referred to as HC storage catalyst.

In this embodiment, both an oxidation catalyst and an HC storage material are applied to the substrate in the microreactor shown in FIG. 4. Both materials are applied physically separately from one another, each on one side of the substrate. The HC-storing material was applied to the side of the substrate facing the gas inlet, while the catalyst was applied to the gas outlet side of the substrate on which the Pt heating structure is also present. Since the catalyst is in direct contact with the heating structure, it can thus be heated more quickly than the adsorber. It is thus possible for catalyst function to be substantially established before the HC storage starts to release the hydrocarbon.

Figure 5:
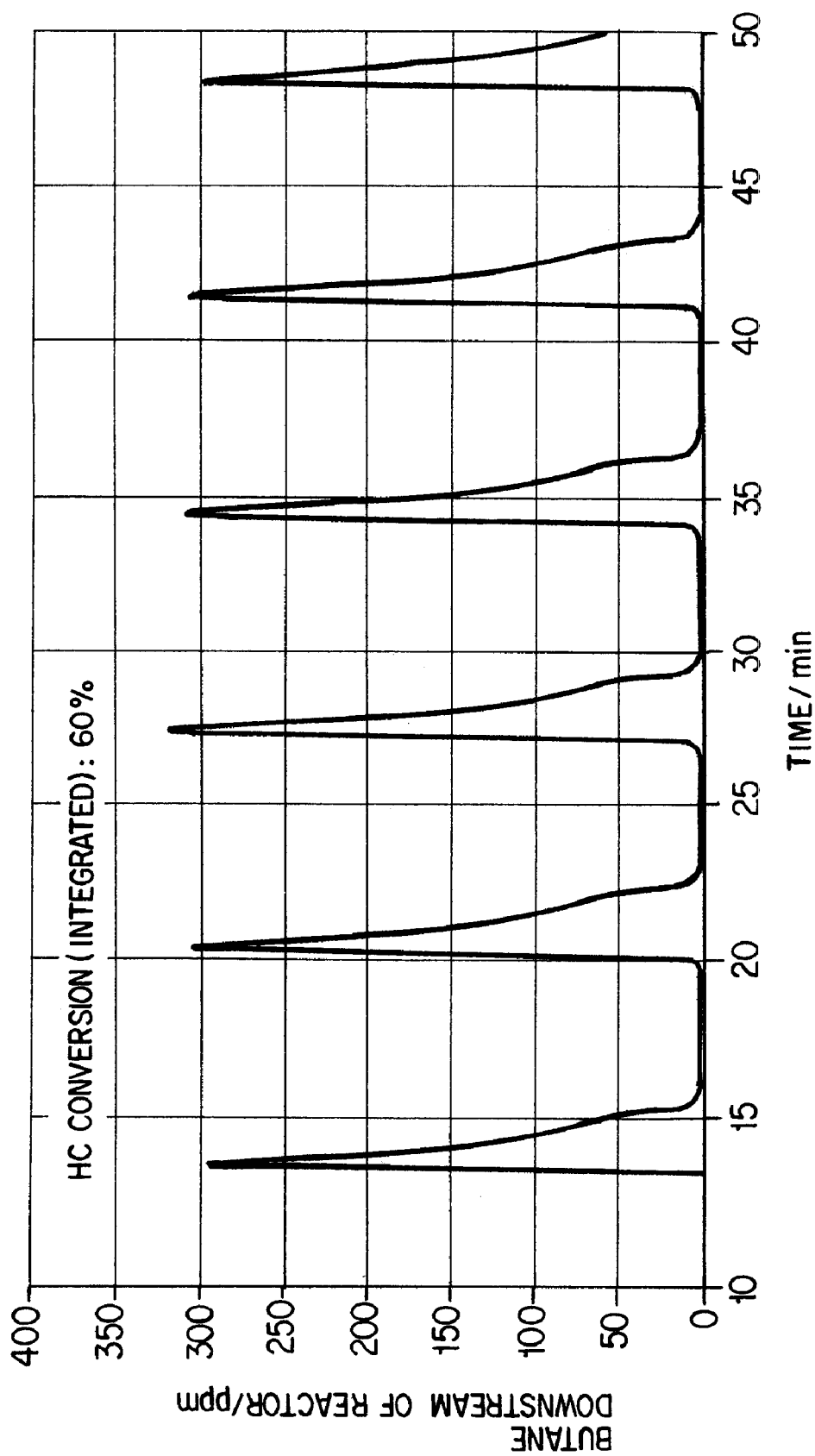
FIG. 5 shows the butane concentration at the outlet of a catalytic reactor according to the invention which additionally contains an HC storage material, in discontinuous operation (total volume flow: 5 ml/min; about 20 mg of activated carbon + about 20 mg of Pt/Al₂O₃ catalyst; butane concentration at the inlet: 100 ppm in air).

An example of a result is shown in FIG. 5. As HC adsorbent, use was made of Pt-doped activated carbon; the catalyst used was Pt/Al₂O₃ (5% Pt by mass). The reactor was alternately operated for 5 minutes at zero voltage and subsequently for 2 minutes at a potential of 2.8 V. This cycle was repeated a number of times. FIG. 5 shows the way in which the butane concentration at the outlet of the reactor changes during such operation. During zero-voltage operation of the reactor, storage of butane is observed. The butane concentration downstream of the reactor is virtually zero during this phase. If the temperature of the substrate is then increased by application of a potential to the Pt heating structure, the hydrocarbon is released from the HC adsorbent and is reacted in the presence of the Pt catalyst. During this switching procedure, butane breakthroughs occur at the reactor outlet, since some release of the HC from the storage before the catalyst has become active. Nevertheless, the major part of the butane, namely 60%, is converted. The mean power uptake of the reactor is 0.3 W compared with 0.8 W when the catalytic reactor is operated continuously to achieve the same HC conversion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An apparatus for reducing emission of vaporized hydrocarbons in a fuel supply system having a fuel tank with a breather line disposed between said fuel tank and ambient atmosphere, said apparatus comprising:

a filter connected to said breather line, between said fuel tank and ambient atmosphere, for binding hydrocarbons emitted by said system; and a catalyst installed in said breather line downstream of the filter, for oxidation of hydrocarbons exiting from the filter.

2. The apparatus according to claim 1, further comprising a hydrocarbon-storing solid disposed downstream from said filter in said breather line, which hydrocarbon-storing solid stores hydrocarbons exiting from the filter and releases them when the temperature is increased, so that the hydrocarbons released are oxidized in the presence of the catalyst.

3. The apparatus according to claim 1, wherein the catalyst comprises a noble metal, being one of Pt, Pd, Rh, Ir and Au, or a transition metal, being one of Mn and Co, applied to a microporous support made from a material selected from the group consisting of $Al_2O_3$, $SiO_2$, $TiO_2$ and a zeolite.

4. The apparatus according to claim 3, wherein the microporous catalyst support is also the hydrocarbon-storing solid.

5. The apparatus according to claim 2, wherein the hydrocarbon-storing solid is one of activated carbon, $SiO_2$, $ZrO2_3$, $TiO_2$ and a zeolite.

6. The apparatus according to claim 2, wherein at least one of the catalyst and the hydrocarbon-storing solid is present on a ceramic or metallic geometric support.

7. The apparatus according to claim 6, wherein at least one of the catalyst and the hydrocarbon-storing solid is present in layer form.

8. The apparatus according to claim 7, wherein the catalyst and the hydrocarbon-storing solid are arranged in superposed layers.

9. The apparatus according to claim 7, wherein:

the catalyst and the hydrocarbon-storing solid are present in physically separate regions; and the hydrocarbon-storing solid is located upstream of the catalyst, relative to the flow direction of the hydrocarbon-containing gas).

10. The apparatus according to claim 6, wherein the catalyst and the hydrocarbon-storing solid are present as a mixture of solids.

11. The apparatus according to claim 6, wherein the geometric support is configured as a planar or tubular electrically insulating substrate (8) which is provided with a resistance heating structure (5).

12. The apparatus according to claim 11, wherein the substrate comprises $Al_2O_3$.

13. The apparatus according to claim 11, wherein the substrate comprises a ceramic having a positive temperature coefficient.

14. The apparatus according to claim 11, wherein the catalyst is applied to a side of the substrate on which the heating structure is located.

15. The apparatus according to claim 1, wherein at least one of the catalyst and the hydrocarbon-storing solid is present as a fixed bed, in the form of one of pellets, spheres and extrudates.

16. A vehicle powered by at least one internal combustion engine or by fuel cells, and having a fuel supply system including a fuel tank with a breather line disposed between said fuel tank and ambient atmosphere, and apparatus for reducing emission of vaporized hydrocarbons from said fuel supply system, wherein said apparatus comprises:

a filter connected to said breather line, between said fuel tank and ambient atmosphere, for binding hydrocarbons emitted by said system; and a catalyst installed in said breather line downstream of the filter, for oxidation of hydrocarbons exiting from the filter.

17. A process for reducing hydrocarbon emissions from a motor vehicle fuel supply system having a fuel tank with a breather line disposed between said fuel tank and ambient atmosphere, said process comprising:

storing hydrocarbons in an activated carbon filter connected to said breather line, between said fuel tank and ambient atmosphere; and oxidizing hydrocarbons which have passed through the activated carbon filter, in the presence of a catalyst which is disposed in said breather line, downstream of said filter.

18. The process according to claim 17, wherein hydrocarbons which have passed through the activated carbon filter are stored in a solid hydrocarbon-storing material selected from the group consisting of activated carbon, $SiO_2$, $ZrO_2$, $TiO_2$ and a zeolite, prior to a catalytic oxidation;

said hydrocarbons are released from said hydrocarbon-storing materials at intervals; and said released hydrocarbons are transferred to the downstream catalyst.

19. The process according to claim 18, wherein:

the hydrocarbon-storing material is in contact with a substrate; and release of the hydrocarbons from the hydrocarbon-storing material is triggered by heating of the substrate.

* * * * *